July 20, 1954   J. A. DE SMET   2,684,288
SOLVENT EXTRACTION APPARATUS WITH AUTOMATIC CONTROLS
Filed Dec. 19, 1949   10 Sheets-Sheet 1
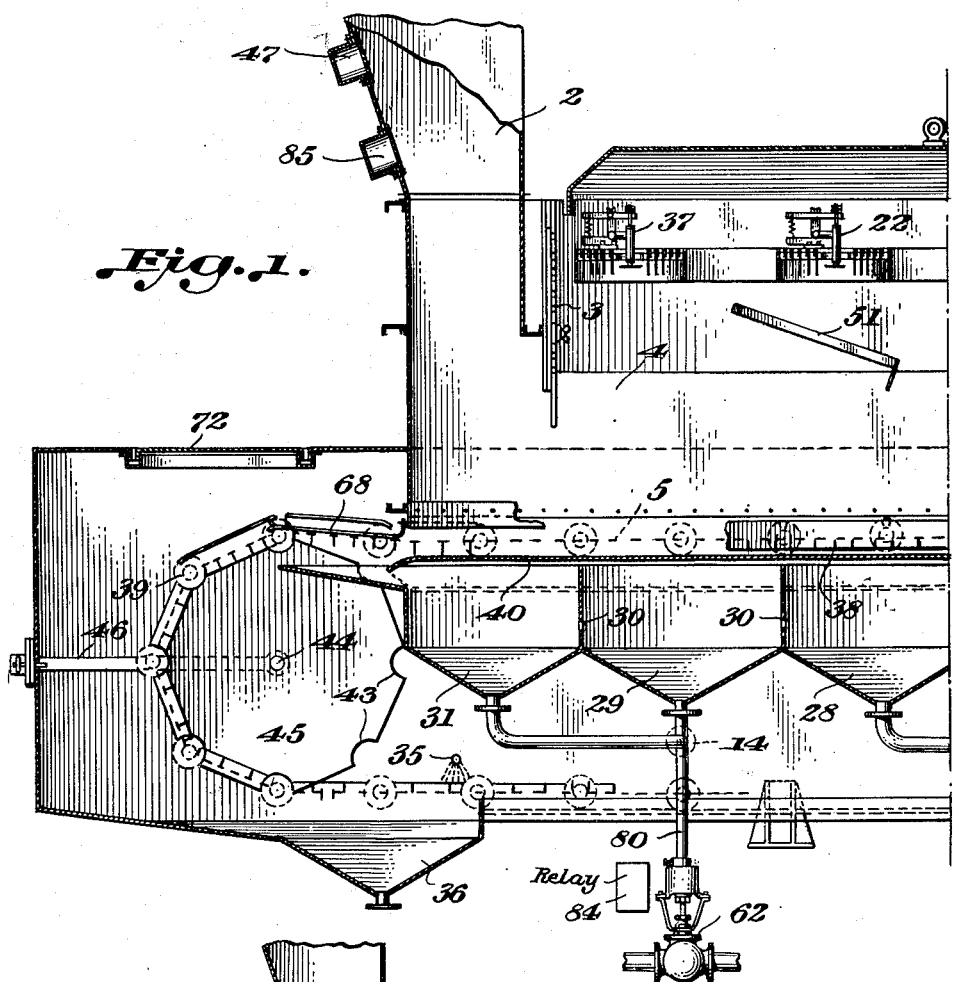
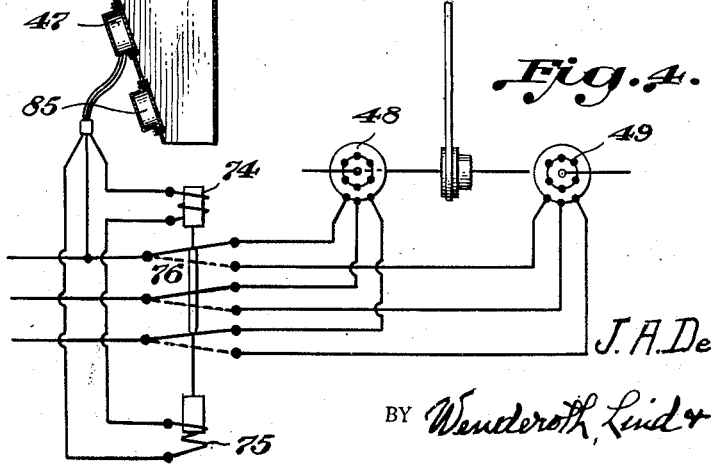
INVENTOR
J. A. De Smet
BY Wenderoth, Lind & Ponack
ATTORNEYS

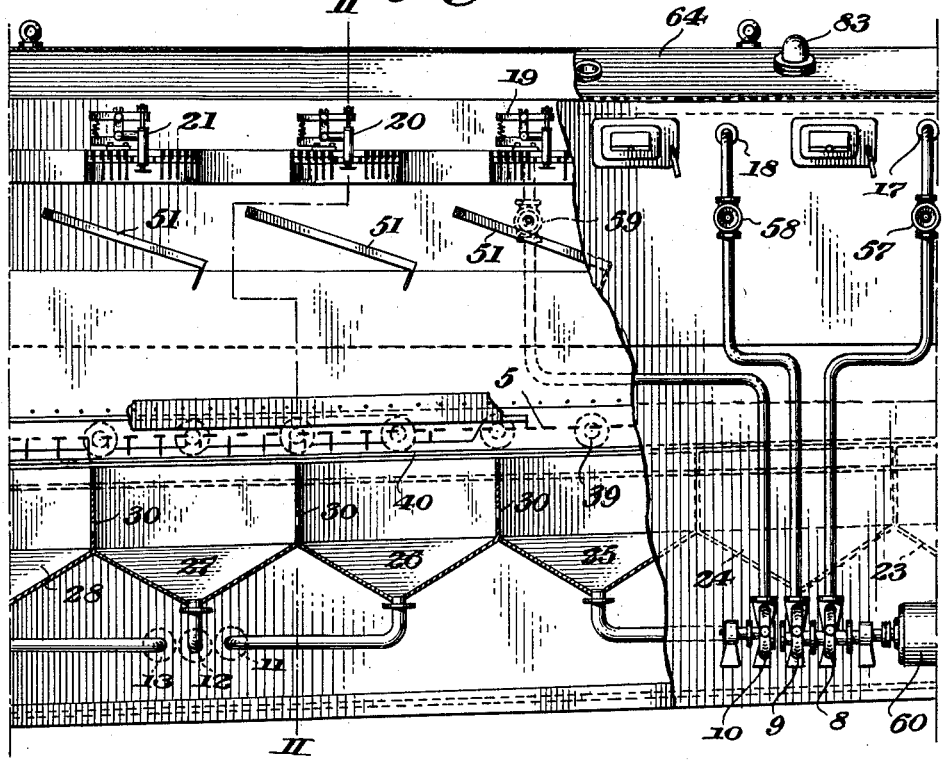
Fig. 1ᵃ
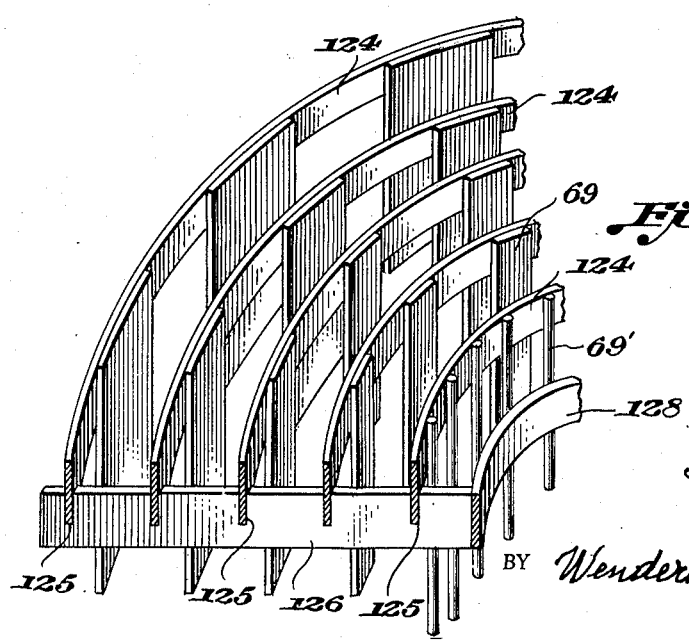
Fig. 3.
INVENTOR
J. A. De Smet
BY Wenderoth, Lind & Ponack
ATTORNEYS July 20, 1954 J. A. DE SMET 2,684,288
SOLVENT EXTRACTION APPARATUS WITH AUTOMATIC CONTROLS
Filed Dec. 19, 1949 10 Sheets-Sheet 3
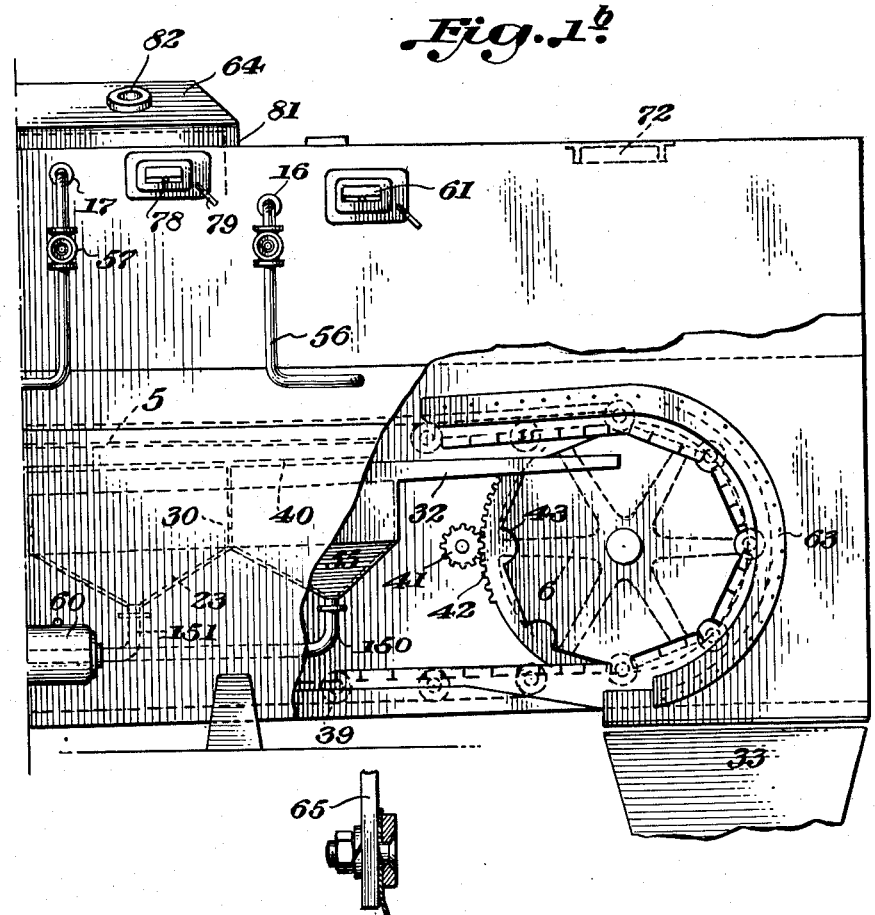
Fig. 1<sup>b</sup>
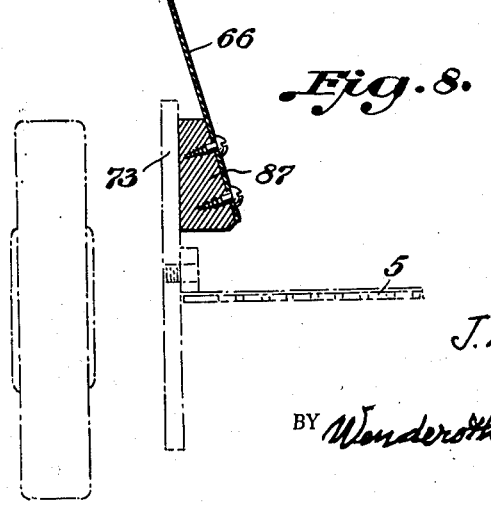
Fig. 8.
INVENTOR
J. A. De Smet
BY Wenderoth, Lind & Ponack
ATTORNEYS July 20, 1954 J. A. DE SMET 2,684,288
SOLVENT EXTRACTION APPARATUS WITH AUTOMATIC CONTROLS
Filed Dec. 19, 1949 10 Sheets-Sheet 4

INVENTOR
J. A. De Smet

BY Wenderoth, Lind & Ponack
ATTORNEYS

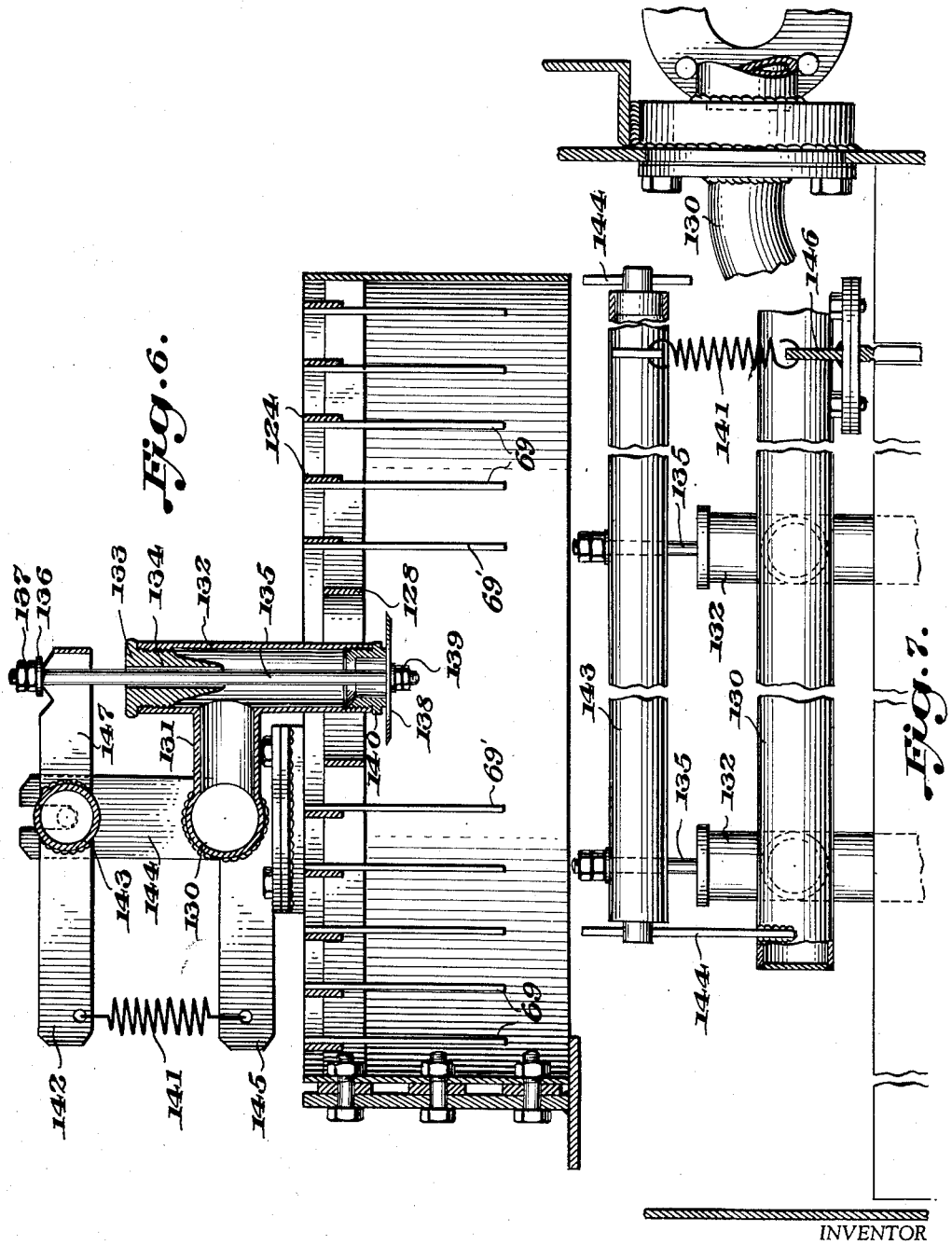

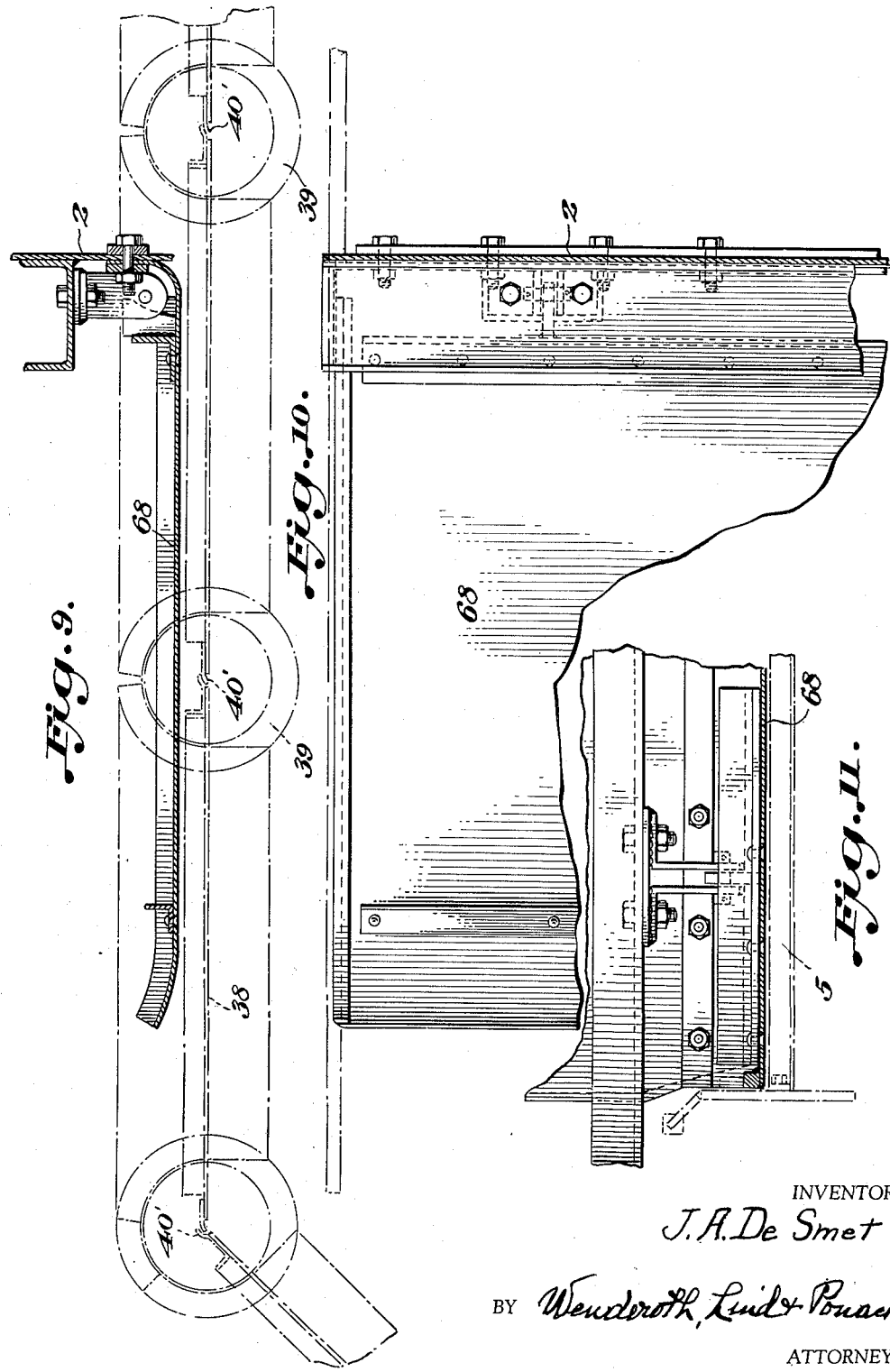

July 20, 1954 J. A. DE SMET 2,684,288
SOLVENT EXTRACTION APPARATUS WITH AUTOMATIC CONTROLS
Filed Dec. 19, 1949 10 Sheets-Sheet 7
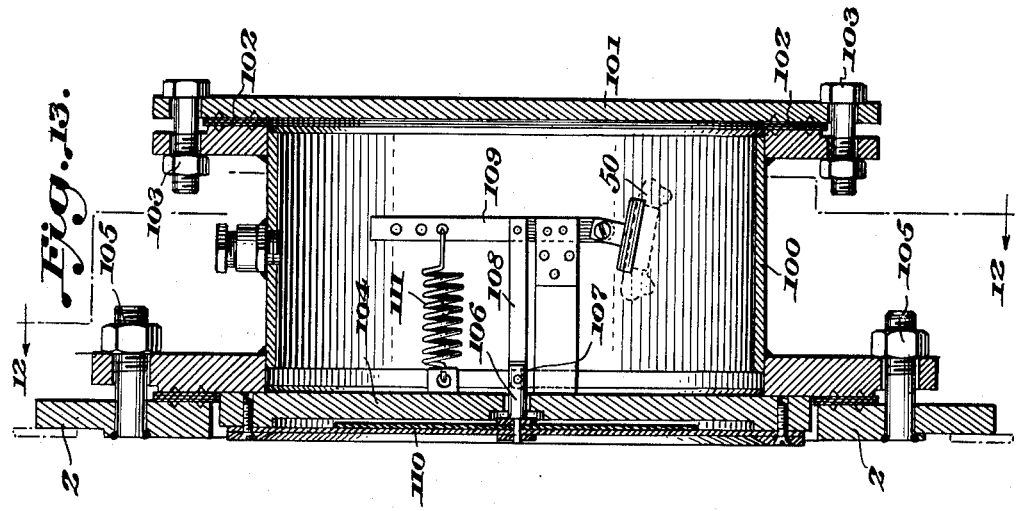
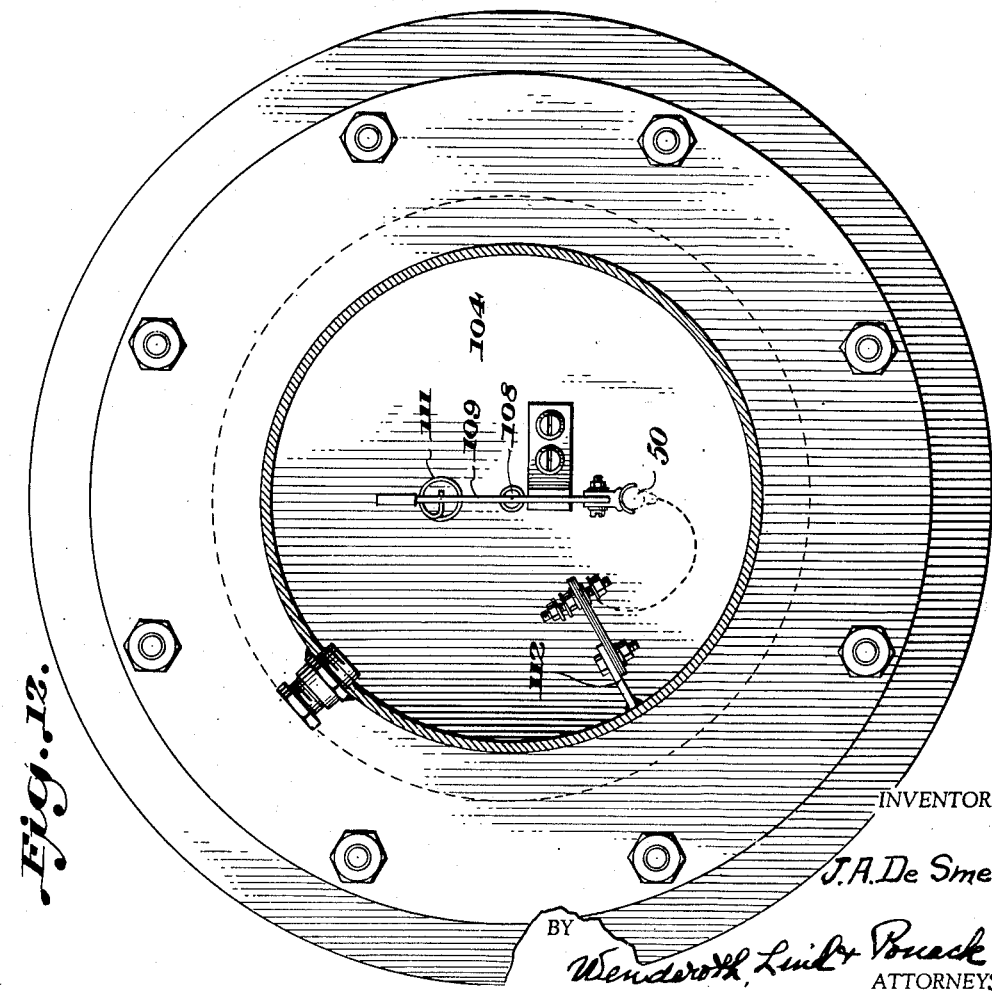
INVENTOR
J.A. De Smet
BY Wenderoth, Lind & Ponack
ATTORNEYS July 20, 1954   J. A. DE SMET   2,684,288
SOLVENT EXTRACTION APPARATUS WITH AUTOMATIC CONTROLS
Filed Dec. 19, 1949   10 Sheets-Sheet 8
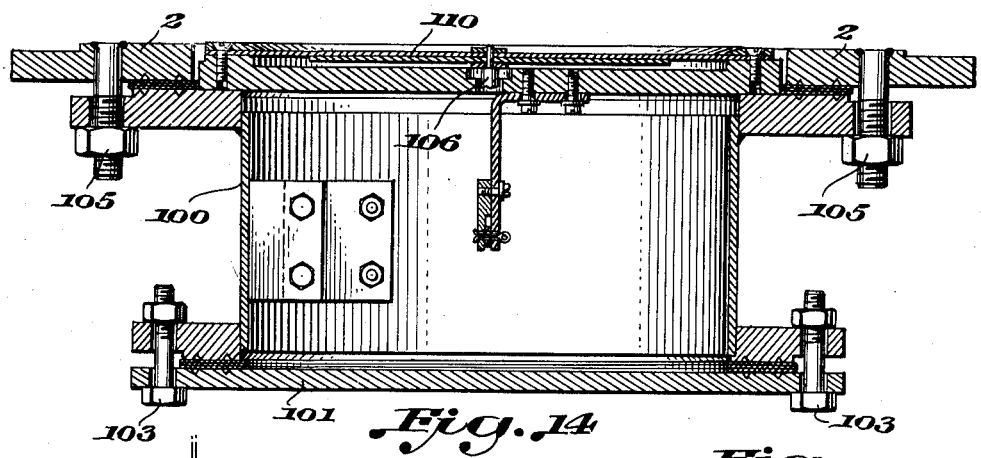
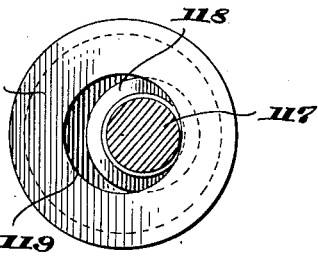
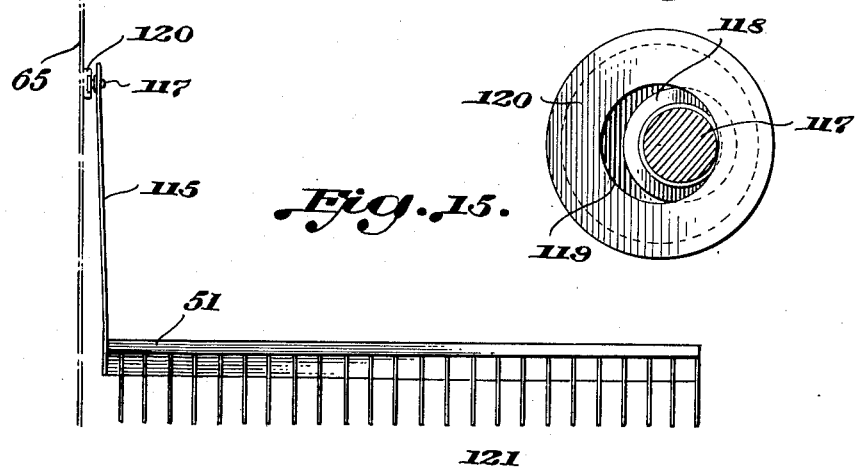
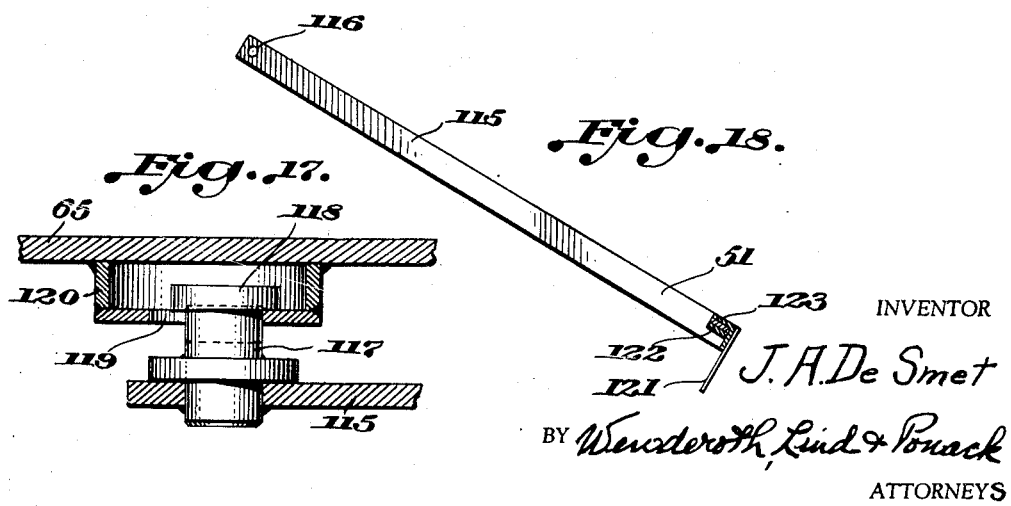
INVENTOR
J. A. De Smet
BY Wenderoth, Lind & Ponack
ATTORNEYS INVENTOR
J. A. De Smet
BY Wenderoth, Lind & Ponack
ATTORNEYS INVENTOR
J. A. De Smet
BY Wenderoth, Lind & Ponack
ATTORNEYS

Patented July 20, 1954

2,684,288

UNITED STATES PATENT OFFICE 2,684,288

SOLVENT EXTRACTION APPARATUS WITH AUTOMATIC CONTROLS

Jean Albert De Smet, Wilryck-Antwerp, Belgium, assignor to La Societe Anonyme "Extraction continue De Smet," a corporation of Belgium Application December 19, 1949, Serial No. 133,825

Claims priority, application Belgium January 26, 1946

5 Claims. (Cl. 23—270)

This application is a continuation-in-part of application Serial No. 663,228, filed April 18, 1946, entitled Machine for Continuous Extraction of Substances from Solid Matters by means of a Solvent, now abandoned.

The present invention relates to a process and apparatus for the continuous liquid extraction of solid materials particularly the extraction of oil from oleaginous grains by means of a solvent.

An object of the invention is to provide an apparatus wherein the solid material preferably pulverized is placed in substantially thick layers upon an apertured endless conveyor and the material is then sprinkled with a solvent.

A further object of the invention is to provide means for stirring the upper layer of the solid material to be treated in order to reestablish the permeability of the upper layer of the material being transported.

A further object of the invention is to provide means whereby a uniform sprinkling of the material to be treated by the solvent is secured.

A still further object of the invention is to provide a plurality of series of sprinklers wherein each series is located in a zone perpendicular to the direction of advance of the material to be treated.

The invention further relates to a process for the continuous extraction of the liquids of the solid materials and in particular to the extraction of the oil from oleaginous grains—with the aid of a solvent for these liquids, of the type in which the solid material preferably pulverized is placed in a substantially thick layer upon an apertured endless conveyor upon which it is sprinkled with the solvent at a plurality of points according to the counter current principle, the miscelle being received in collecting containers provided with means for sending back the miscelle upon the material to be exhausted. The miscelle received in each of the collecting containers is fed back at least once upon the material above the same collecting container, after which it is sent upon the material above the collecting container next adjacent towards the charging end of the conveyor. The miscelle arriving in the second collecting container is in its turn fed back at least once upon the material above said second collecting container in order to be sent then upon the material above the next adjacent container towards the charging end of the conveyor. This cycle of operation is repeated gradually nearer and nearer for each of the collecting containers in the direction of the charging end of the conveyor, the most enriched miscelle received in the collecting container located nearest said end being evacuated, for example, towards the installation for the treatment of the miscelle.

The permability of the material increases from the charging end to the discharging end of the conveyor which permits the flow of the miscelle to be greater at the discharge side. For this purpose according to another improvement, one may regulate the flow of the miscelle which is led back above the same container from which it has come in such manner that the flow increases starting from the charging end towards the discharging end and may be at each place at the maximum compatible with the permeability of the material.

With the above and other objects in view which will become apparent from the detailed description below one form of the invention is shown in the drawings in which:

Figs. 1, 1a, and 1b show a side view of a preferred form of apparatus for carrying out the invention with parts broken away for greater clarity;

Fig. 2 is a cross-sectional view taken along section line II—II of Fig. 1a;

Fig. 3 is a partial perspective view of a portion of the sprinkling means for securing uniform distribution of the solvent upon the material to be treated;

Fig. 4 is a diagrammatic view illustrating the wiring for the electrical motors for driving the conveyor;

Fig. 6 is a cross-sectional view with parts in elevation of a single sprinkler and associated distributing means;

Fig. 7 is a broken side elevational view with parts in cross-section illustrating the means for supplying the sprinklers in a series with the solvent and the control therefor;

Fig. 8 is a cross-sectional view showing the means for securing a tight connection between the conveyor and the retaining wall for the material;

Fig. 9 is a cross-sectional view with parts in elevation showing the airtight plate construction at the charging end of the conveyor;

Fig. 10 is a partial plan view of the construction shown in Fig. 9;

Fig. 11 is a partial front view of the mounting for the retaining plate shown in Figs. 9 and 10;

Fig. 12 is an enlarged plan view with parts broken away showing a control means;

Fig. 13 is a cross-sectional view through the control means of Fig. 12;

Fig. 14 is a cross-sectional view taken at right angles to that of Fig. 13;

Fig. 15 is a partial elevational view of the raking means;

Fig. 16 is an enlarged view of the hinge means for the raking means of Fig. 15;

Fig. 17 is a cross-sectional view illustrating the hinge means of Fig. 16;

Fig. 18 is a side elevation view of the raking means;

In the various figures like reference characters indicate similar elements.

Figure 2:
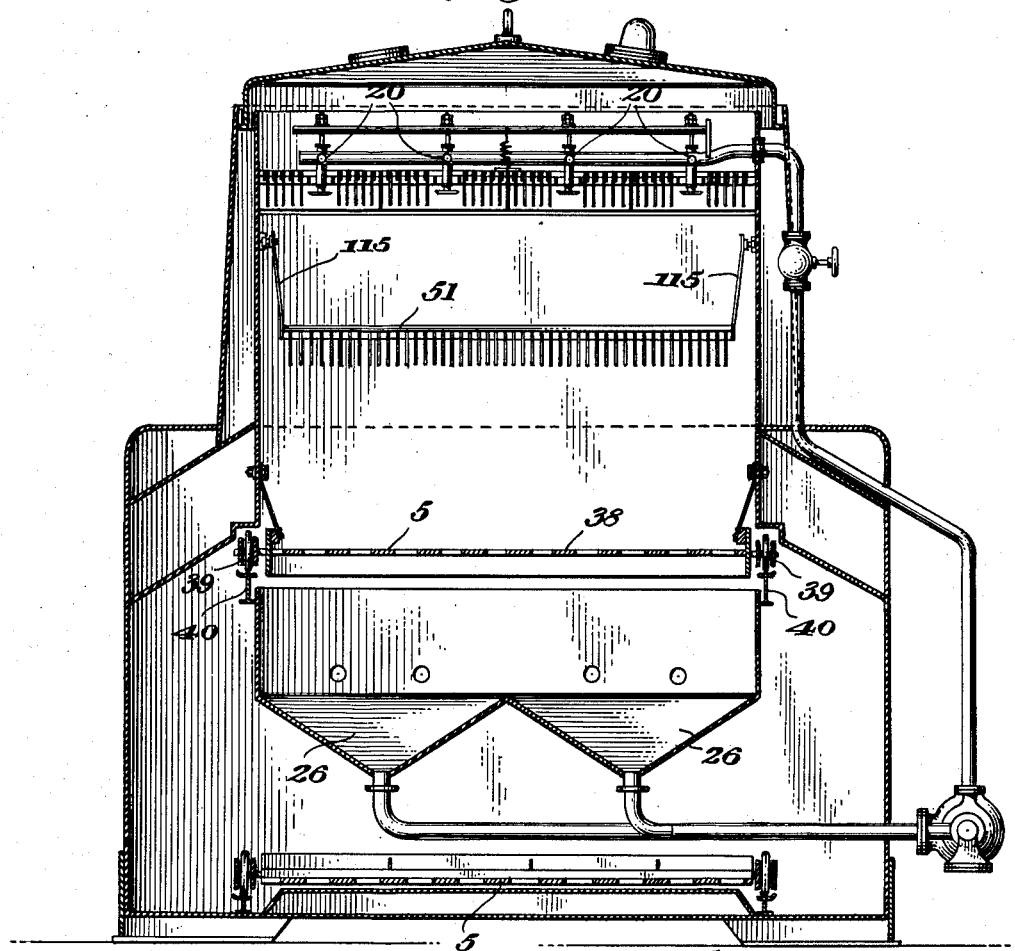

The grains to be treated which are pulverized preferably are charged into the hopper 2 and from the hopper the grains pass directly to and upon a continuous endless chain conveyor 5. A register or gate 3 controls and regulates the height of the layer of grains 4 upon the conveyor and such height is generally between 60 and 120 cm. for example.

The regulation of the height of the layer is advantageous since the height is a function of the qualities of the material to be treated.

The endless chain 5 is composed of a series of articulated elements 38 formed by rigid elements fitted with metal cloth and the elements 38 are supported by the rollers 39 which travel upon the track 40. The articulations are formed by ball and socket joints 40' (see Fig. 9).

The conveyor 5 is driven slowly by the drum 6 and the speed thereof may be regulated. A gear 42 is fixed to the drum 6 and meshing with the gear 42 is a gear 41 driven from an electric motor through the intermediary of a speed reduction system. The speed reduction system is not shown. The drum 6 is provided with grooves 43 in which the rollers 39 seat. The driving drum is preferably located at the discharge end of the conveyor 5. At the charging end of the conveyor, a shaft 44 has mounted thereon a loose drum 45 for guiding the conveyor 5 and this drum is also provided with grooves 43 for receiving the rollers 39. For maintaining proper tension in the conveyor, rods 46 are provided with suitable connections for shifting the shaft 44.

Referring to Fig. 4, the conveyor 5 may be driven by one or the other of two motors 48 and 49 which rotate at different speeds. In this way stopping of the installation is avoided when the production diminishes. For example, if the preceding apparatus or the following apparatus to be considered operates badly or not at all, there arrives a certain time when the quantity of material to be treated may clearly be less than that treated normally. By slowing during such time the advance speed of the conveyor 5, the stopping of the installation may be avoided. The slowing of the conveyor 5 does not affect in a substantial way the treatment even though the time of contact of the miscelle of a determined concentration with the materials to be treated becomes too long.

The speed of the conveyor is regulated by means of a control member 47 shown particularly in Figs. 12, 13 and 14 provided upon the hopper 2. The control member comprises a casing 100 having a bottom 101 secured tightly thereto by the packing 102 and the nut and bolt connections 103. The inward wall 104 facing the hopper 2 is secured tightly to the container 100 and also to the hopper wall by means of the nut and bolt connections 105. The wall 104 is centrally apertured to permit the passage therethrough of the control rod 106 which is pivotally connected at 107 to the link 108 which in turn is pivotally connected to the rod 109 carrying at the end thereof the mercury switch 50 which by suitable connections will place one or the other of the motors 48 and 49 in operation. At the front of the control rod 106 such rod is connected by any suitable means to a flexible or rubber membrane 110. A return spring 111 is connected to the rod 109 and to the container 100.

When the pressure upon the membrane 110 is normal due to the quantity of solid material in the hopper 2 then one of the motors 48 or 49 is connected for driving the conveyor and when the pressure diminishes upon the membrane 110 the mercury switch 50 will be thrown by the connections described above and in such case the slower running motor will be connected so as to drive the conveyor. 112 indicates a support for the terminals for the wires for the circuit including the switch 50 and the motors.

The mercury switch 50 will close the circuit of either the coil 74 (Fig. 4) or the coil 75. If the pressure upon the membrane 110 exceeds a predetermined value then the coil 74 is energized. This coil will then throw the switch 76 to the full line position shown in Fig. 4 thereby setting in operation the motor 48 which is for example an asynchronous squirrel cage motor. This motor then remains in operation and the synchronous speed of such motor is for example 3000 R. P. M.

If the pressure upon the membrane 110 goes below the predetermined pressure mentioned above then the mercury switch 50 will be operated so as to close the circuit containing the coil 75. Energization of the coil 75 throws the switch 76 to the dotted line position and thereby closes the circuit for the motor 49 which will then drive the conveyor. The motor 49 may be an asynchronous squirrel cage motor whose synchronous speed is equal to 1,500 R. P. M.

A second control device 85 is placed below the control member 47 upon the hopper 2. The control device 85 is constructed the same as the control device 47. When the pressure exerted upon the membrane 110 of the control device 85 becomes less than the predetermined pressure, that is if the material to be treated contained in the hopper 2 only covers a portion of the membrane 110 of the control device 85, the circuit of the motor 49 will be cut through the operation of a mercury switch 50' in the control device 85 so as to stop movement of the conveyor 5.

It will be noted from the above description that the regulation of the speed is completely automatic and requires no supervision. The hopper 2 will always remain partially full of material to be treated, which is of great importance because the material forms a sufficiently tight closure in order to permit the operation of the installation under a pressure slightly different from atmospheric pressure.

Figure 19:
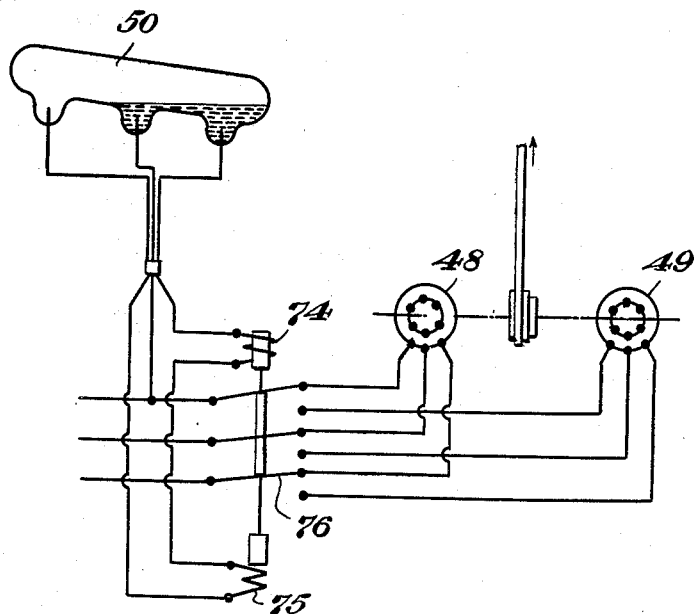
Fig. 19 is a wiring diagram with the control set for one operation of the motors.

In Fig. 19 the wiring diagram shows the position of the switch 50 when the membrane 110 is subjected to a pressure from the grains in the hopper. In this case the motor 48 is actuated.

Figure 20:
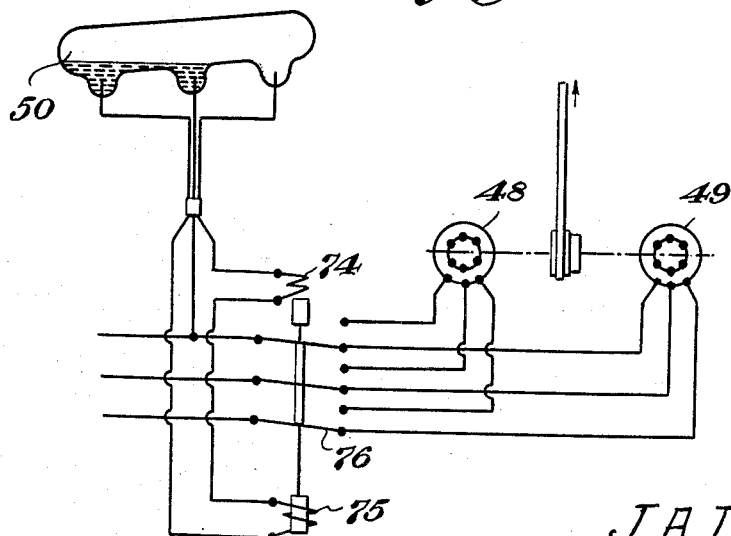
Fig. 20 is a similar diagram illustrating the control in another position.

In Fig. 20 the wiring diagram illustrates the situation when the membrane 110 is not subjected to a pressure from the material to be treated. In such case the coil 75 is actuated thereby connecting the power with the motor 49.

Figures 21, 22, 23:
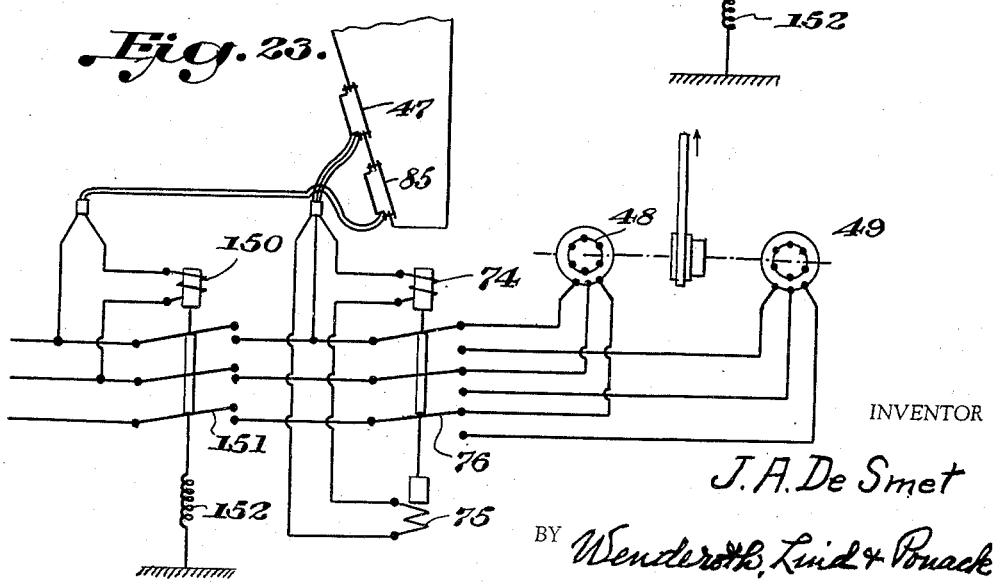
Fig. 21 is a wiring diagram illustrating another control of the apparatus in one position.
Fig. 22 is a view similar to Fig. 2 showing another position of the control.
Fig. 23 is a combined view of the wiring for both controls.

In Fig. 21 the mercury switch 50' which is associated with the control element 85 is shown in the position which it occupies when the material to be treated no longer exercises a pressure on the membrane 110. In such case the circuit through coil 150 is closed and such coil being energized breaks the switch 151 against the action of the spring 152.

If there is a pressure on the membrane 110 of the control 85 then in such case the wiring diagram of Fig. 22 illustrates the situation. In this case the circuit through the coil 150 is broken and the spring 152 becomes active to close the circuit to the motor.

In Fig. 23 the wiring diagram for the combined action of the controls 47 and 85 is shown and it is believed that with the explanation above the construction and operation thereof is obvious.

Rakes 51 are provided at spaced points throughout the apparatus for raking the surface of the layer of material to be treated throughout the entire width of such layer. These rakes are constructed as shown more particularly in Figs. 15, 16, 17 and 18. The arms 115 are provided with an aperture 116 at one end thereof in which is secured by welding or soldering a trunnion 117. The trunnion 117 has a head 118 thereon which extends into an opening 119 provided in a socket container 120 secured by soldering or welding to the side walls 65 of the apparatus. The head 118 is slightly smaller than the aperture 119 so that the rakes may oscillate freely and at the same time may be easily removed for repairs or replacement. The teeth 121 of the rake may be formed in any desired way. As shown, the lower ends of the arms 115 are connected fixedly by plates 122 which in turn have secured thereto an angle iron 123 to which the teeth 121 may be secured by welding or in any other desired manner.

The rakes 51 have a double role. They reestablish the permeability of the upper bed by stirring the same. Moreover, they cause the formation at the surface of the layer of a kind of talus which avoids the mixtures of miscelle of different concentrations coming from the successive vaporizers or sprinklers.

Throughout the entire length of its passage through the apparatus the layer of grains is sprinkled with miscelle of different concentrations pumped by the pumps 8 to 13 into the regularly arranged vaporizers or sprinklers 17 to 22. Each of the pumps may be replaced by a series of pumps placed in parallel.

The miscelle are collected under the upper driven side of the conveyor 5 in a series of collecting containers in the form of hoppers 23 to 29 interconnected by overflows 30.

The sprinklers or vaporizers 17 to 22 are of a special construction in order to accomplish the function desired. One form of construction is shown in Figs. 3, 5, 6 and 7. Referring to Fig. 3 the distributing means for uniformly distributing the solvent over a predetermined area of the top surface of the material to be treated comprises bars 69' and plates 69. The bars 69' and plates 69 are secured at their upper ends to a series of concentric rings 124 more particularly shown in Fig. 5. The rings 124 in turn are seated in notches 125 provided in the right angularly disposed supporting plates 126. The plates 126 are secured at their outer ends by welding or the like to the frame 127 and at their inner ends to the interior ring 128 wherein the sprinkling device to be described below is located.

Figure 5:
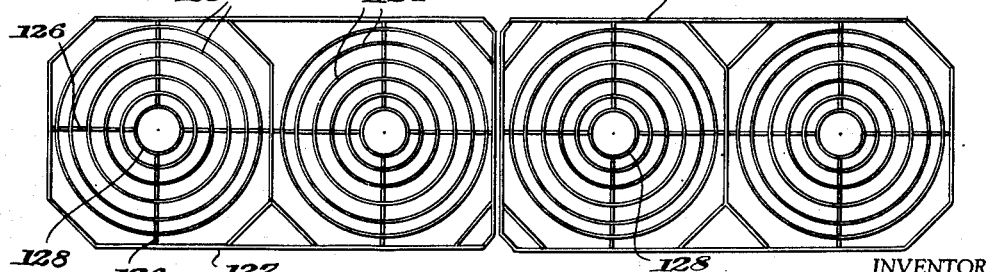
Fig. 5 is a plan view of one series of distributors used in conjunction with the sprinkling units for securing uniform distribution of the solvent.

Generally the installation comprises a plurality of series of four sprinklers and distributors located in the same zone as shown more particularly in Figs. 2 and 5 and are uniformly disposed throughout the width of the layer of material to be treated.

The sprinkling unit associated with each distributing means is shown particularly in Figs. 6 and 7. This comprises a conduit 130 which communicates by inlet conduits 131 with the vertically arranged sprinkler cylinder 132. The sprinkler unit is itself disposed within the center of the ring 128 previously referred to. Within the cylinder 132 and threaded to the upper portion thereof is a stopper 133 having a bore 134 through which extends a rod 135. The rod 135 is threaded at its upper end and has mounted thereon an abutment 136 held in place by the lock nuts 137. At the lower end of the rod 135 there is secured a circular plate 138 by means of the lock nuts 139. Threadedly secured to the lower end of the cylinder 132 is a valve seat 140 which cooperates with the plate 138 to dispense the solvent or liquid coming from the conduit 130 in a horizontal plane perpendicular to the distributors 69' and 69. The plate 138 is urged against the valve seat 140 by a spring 141. The tension of the spring 141 may be adjusted by regulating the position of the abutment 136 by means of the lock nuts 137. The plate 136 may be soldered to the lower nut of the lock nuts 137. The spring 141 is connected at one end to a plate 142 fixed to a freely rotatable tube 143 seated in the standards 144 secured to a fixed part of the apparatus. The lower end of the spring 141 may be secured to a plate 145 which in turn is fixed to a fixed part of the apparatus or it may be fixed to a regulating screw 146 as shown in Fig. 7. In the latter case an additional regulation of the spring 141 may be secured by adjusting the screw 146.

Extending from the other side of the tube 143 from the plate 142 are the abutting plates 147 which cooperate with the abutments 136. In the construction such as shown in Fig. 2 there would be four such abutting plates 147.

When the pressure of the liquid coming through the conduit 130 exceeds the pressure exerted by the spring 141 the plate 138 will be moved away from the valve seat 140 and any variations in pressure will bring about a variation in the opening between the plate 138 and 140.

The arrangement of the distributing elements 69 and 69' is such that every plane through the axis of the atomizer will meet at least one of the elements 69 or 69'. At the corners of the frame 127 plates may be located as shown in Fig. 5.

By the arrangement described the liquid projected from the opening between the plate 138 and the seat 140 will be dispersed and a very thorough and uniform sprinking of the materials will take place. Furthermore a portion of such jets will be stopped by the central bars 69' while another portion will continue until it strikes the other elements 69 and therefore a uniform humidification of the plane located below the sprinkler is obtained.

It will be noted that a sprinkler constructed as described above may advantageously be used for sprinkling liquids wherein there is a certain quantity of solid materials. Such solid materials can not obstruct the passage provided for the escape of the liquid since this passage is regulated automatically.

From the construction described also it will be noted that the utilization of a single spring 141 for regulating a series of four atomizers will result in a uniform distribution through all of said four atomizers.

It is also obvious that the bars 69 and 69' may have different lengths as desired.

The zone in which the vaporizers are located of the same series is perpendicular to the direction of advance of the material to be treated, therefore to the direction of advance of the upper driven belt of the conveyor.

The layer of material to be treated becomes thinner in proportion to the treatment; in order to compensate for the inclination of the surface which results therefrom, the conveyor has a slight inclination of the order of 1%, the evacuation of the solid materials having been subjected to the extraction constituting the higher point.

It is to be remarked that the arrangement of the vaporizers as well as that of the rakes 51 are well predetermined. Each series of vaporizers is located above a portion of a collecting container, the portion located at the side of the charging of the conveyor. It results therefrom that the material to be treated is sprinkled during the time it is conveyed below the first portion of a collecting container. The material is not subjected to any sprinkling during the time that it is transported below the second portion of such container, but it is again sprinkled when it comes below the first portion of the adjacent container nearer to the discharge end. During the course of the transport below the second portion of the container the material drains.

This arrangement of the vaporizers is provided for the purpose of avoiding any mixture of the miscelle of different concentrations. Also for this purpose rakes 51 are located in such manner that each of them comes in contact with the portion of the layer above the material to be treated which is below the collecting container at the limit of the zone which is sprinkled by a series of vaporizers, a limit located at the side of the discharge of the conveyor. Each rake forms a talus at the place where it comes into contact with the material to be treated. The layer is therefore divided into zones which are sprinkling zones and draining zones. After each zone which is sprinkled, there is formed a talus.

Through the conduit 56 and the vaporizer 16 there is sent a pure solvent upon the grains which have already been sprinkled and therefore almost completely deoiled and as shown in Fig. 1b. The solvent slightly charges the oil while traversing the layer 4 and falls into the hopper 55. This solvent becoming miscelle, passes through an overflow 30 into the hopper 23 and is taken from this latter by the pump 8 in order to sprinkle the grains above the hopper 23. The hopper 55 is also connected to the suction side of the pump 8 by conduit 150. The hopper 23 is connected by the overflow 30 to the neighboring hopper 24 whose bottom is connected to the suction side of pump 9 by conduit 151 whose pressure side is connected to the vaporizers 18 located above the hopper 24. The miscelle collected at 23 overflows thereafter into 24 and is taken up by the pump 9 to sprinkle the material.

Likewise hopper 24 flows over into hopper 25 and so on to hopper 29 while each of the pumps 8 to 13 send the miscelle above the hopper through which it is fed. This permits giving the pumps 8 to 13 a far more important flow than that of the feed through the conduit 56 and the vaporizers 16. Each hopper flows over into its neighboring hopper from 23 to 29, a flow equal to that of the feed through the conduit 56 conveying the pure solvent increased by the dissolved oil.

Finally through an overflow 30 the hopper 29 which contains the richest miscelle feeds a hopper 31. From these latter hoppers 29 and 31 the miscelle are sent towards the distillation apparatus through the intermediary of a pump 14.

The pumps 8 to 13 are individually regulated by valves at 57, 58, 59 etc., because the permeability of the material increases from the entrance to the discharge. This difference in permeability allows the flow of miscelle to be more elevated at the discharge side. The flow of each of the pumps 8 to 13 is moreover regulated in such a way that it may always be held at a maximum compatible with the permeability of the layer above the collector considered, a permeability which increases starting from the charging end towards the discharging end. The pumps are mounted in groups and several pumps are driven by a single motor, for example 60.

At 35 the slope of the sprinkling assures the washing of the conveyor by the richly filtered miscelle, after the discharge of the grains which have been drained. After the washing the miscelle are collected in a hopper 36. The miscelle collected in this hopper 36 are then sent back upon the fresh grains at 37.

Sight holes 61 are provided adjacent each of the series of vaporizers. Each side is provided with a glass plate 78 which can be operated by a handle 79. The hoppers which receive the miscelle have a height sufficient to contain all the liquid which is located in the portion of the layer which is above the hopper considered. In this way, if a breakdown of the electric current takes place the miscelle, in spite of the stoppage of the pumps, may be accommodated in the hoppers. The overflows which permit the miscelle to pass from one hopper to the succeeding hopper are provided well below the upper level of the hoppers. Moreover, an automatic sluice gate 62 is located upon the evacuation conduit 80 of the last two hoppers in order to avoid all evacuation of the miscelle in case of a breakdown of the current and all mixture of the miscelle of different concentration which might result therefrom. The sluice gate 62 is for example controlled by a relay 84 which closes this sluice gate 62 if the tension of the electrical network which feeds the electrical portion of the installation becomes lower than a predetermined value.

The portion 32 of the installation provided between the hopper 55 and the discharge end of the conveyor serves to collect the solvent draining before discharge of the drained and exhausted grains at 63, towards a hopper 33, from where they are retaken and directed towards an installation for the recovery of the solvents. A large cover 64 with a hydraulic joint 81 permits access to any point whatever of the apparatus. The apparatus also comprises man-holes such as 72 with hydraulic joints which permits rapid access and a perfect air tightness. The cover comprises the supports 82 for lights. An electric light is fixed at 83.

The upper level of the endless conveyor moves between two fixed walls 65 which maintain the layer of material to be treated. An air-tight joint is provided between the conveyor and each of these walls.

This joint is shown in Fig. 8 and comprises an elastic leaf 66 which is secured to the wall 65. A lath 87 is secured to the lower surface of the leaf 66 and is applied against an edge 73 of the conveyor. The weight of the material itself being treated secures airtightness between the elements 87 and 73.

At the charging end of the apparatus an airtight plate 68 is secured in order to avoid losses. This plate 68 more particularly shown in Figs. 9, 10, and 11 comprises a flexible sheet which rests upon the ball and socket joints connecting two successive bodies forming the conveyor. In this way the friction of such plate 68 upon the metallic sheets comprising the conveyor is avoided. The specific manner in which the plate 68 is secured to the lower end of the hopper 2 is shown particularly in Figs. 10 and 11. These figures clearly show the construction involved.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. In an apparatus for the continuous countercurrent extraction of a layer of pulverized oleaginous grains continuously fed from a supply hopper onto a porous endless conveyor and treated with an oil extracting solvent from a sprinkling means above said conveyor and provided with collecting means below said conveyor to collect the solvent drained from the conveyor, that improvement comprising electrically operated driving means including electrical switching means, rapidly rotating driving means and slowly rotating driving means to drive said conveyor at a speed in accordance with the amount of pulverized grain fed to said conveyor from said hopper, a pressure responsive flexible membrane attached below said hopper which is displaced in accordance with the weight of the grains in said hopper and fed by said hopper to said conveyor, said membrane operatively connected to said switching means for the automatic control of said driving means, automatically controlled spring tensioned valve means connected to said sprinkling means to regulate the flow of solvent to said grains on said conveyor in accordance with the amount of grain fed from the supply hopper and the amount of grain withdrawn at the end of said conveyor, said switching means operatively connected to said rapidly rotating driving means and to said slowly rotating driving means to switch in the rapidly rotating driving means when said member is subjected to a greater pressure of grains from said hopper and to switch in said slowly rotating driving means when said membrane is subjected to a lesser pressure of grains from said hopper, and a gate to control and regulate the height of the layer of grains upon said conveyor.

2. An apparatus as claimed in claim 1, wherein said conveyor is provided with lateral fixed walls to maintain the height of the layer of pulverized grains on said conveyor and wherein an airtight joint is provided between said conveyor and said fixed walls.

3. An apparatus as claimed in claim 2, wherein said endless conveyor is fitted at the discharge end thereof with an elastic leaf member secured to said fixed walls, said leaf member provided with a lath and pressing against the edge of the conveyor to maintain an airtight joint thereagainst.

4. An apparatus as claimed in claim 1, wherein said conveyor is inclined upwardly from the loading end of the discharge end, so that the solid extracted grains are withdrawn by the withdrawal and return means at the highest point of said conveyor.

5. An apparatus as claimed in claim 1, wherein there is provided a second membrane located in the hopper below said first mentioned membrane and operating an interrupter which places said driving means out of operation if the pressure exercised upon the second membrane is below a predetermined pressure.

References Cited in the file of this patent

UNITED STATES PATENTS

| Number | Name | Date |
| --- | --- | --- |
| 307,707 | Byerly | Nov. 4, 1884 |
| 427,410 | Forbes | May 6, 1890 |
| 654,170 | Malard | July 24, 1900 |
| 813,078 | Bernhardt | Feb. 20, 1906 |
| 899,339 | Shuman | Sept. 22, 1908 |
| 1,892,790 | Smelser | Jan. 3, 1933 |
| 2,055,941 | Newhouse | Sept. 29, 1936 |
| 2,264,390 | Levine et al. | Dec. 2, 1941 |
| 2,447,845 | Dinley | Aug. 24, 1948 |
| 2,489,599 | Trottmann | Nov. 29, 1949 |